D. O. BOWMAN.
SPRAYER.
APPLICATION FILED FEB. 16, 1909.

931,030.

Patented Aug. 17, 1909.
2 SHEETS—SHEET 1.

Witnesses
H. O. Van Antwerp
Georgiana Chace

Inventor
D. O. Bowman
By Luther V. Moulton
Attorney

D. O. BOWMAN.
SPRAYER.
APPLICATION FILED FEB. 16, 1909.

931,030.

Patented Aug. 17, 1909.
2 SHEETS—SHEET 2.

Witnesses
H. O. Van Antwerp.
Georgiana Chace

Inventor
D. O. Bowman
By Luther V. Moulton
Attorney

UNITED STATES PATENT OFFICE.

D O BOWMAN, OF ROCKFORD, MICHIGAN.

SPRAYER.

No. 931,030.

Specification of Letters Patent.

Patented Aug. 17, 1909.

Application filed February 16, 1909. Serial No. 478,300.

*To all whom it may concern:*

Be it known that I, D O BOWMAN, a citizen of the United States of America, residing at Rockford, in the county of Kent and State of Michigan, have invented certain new and useful Improvements in Sprayers; and I do hereby declare the following to be a full, clear, and exact description of the invention, such as will enable others skilled in the art to which it appertains to make and use the same.

My invention relates to improvements in sprayers, and more particularly to sprayers, adapted to spray vegetation with some fluid containing matter liable to precipitate or settle, and its object is to provide a device in which the fluid will be constantly agitated to prevent a deposit of sediment therein, to provide improved means for adjusting the spraying nozzles when in operation; and to provide the device with various new and useful features hereinafter more fully described and particularly pointed out in the claims.

Figure 1:
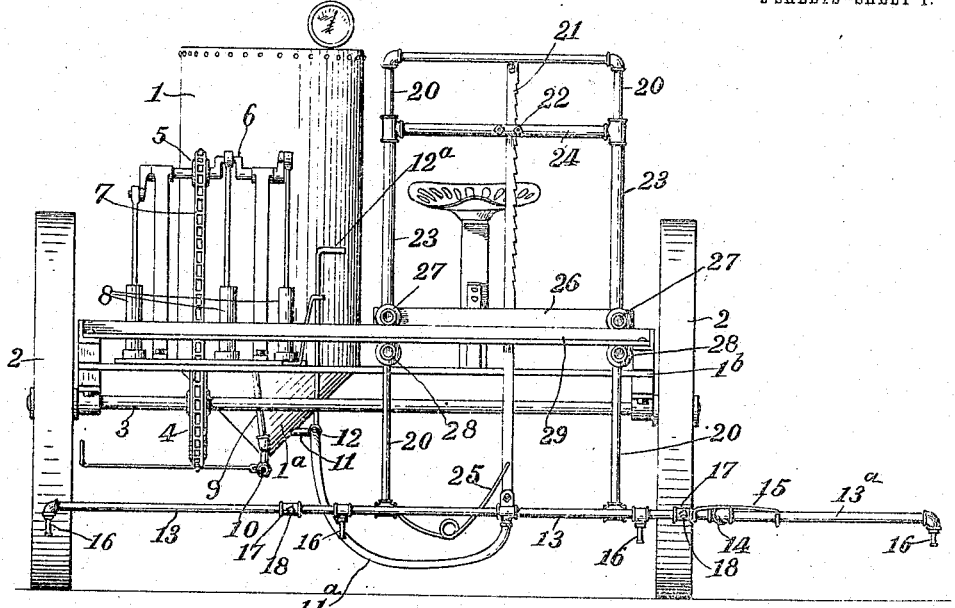
Figure 2:
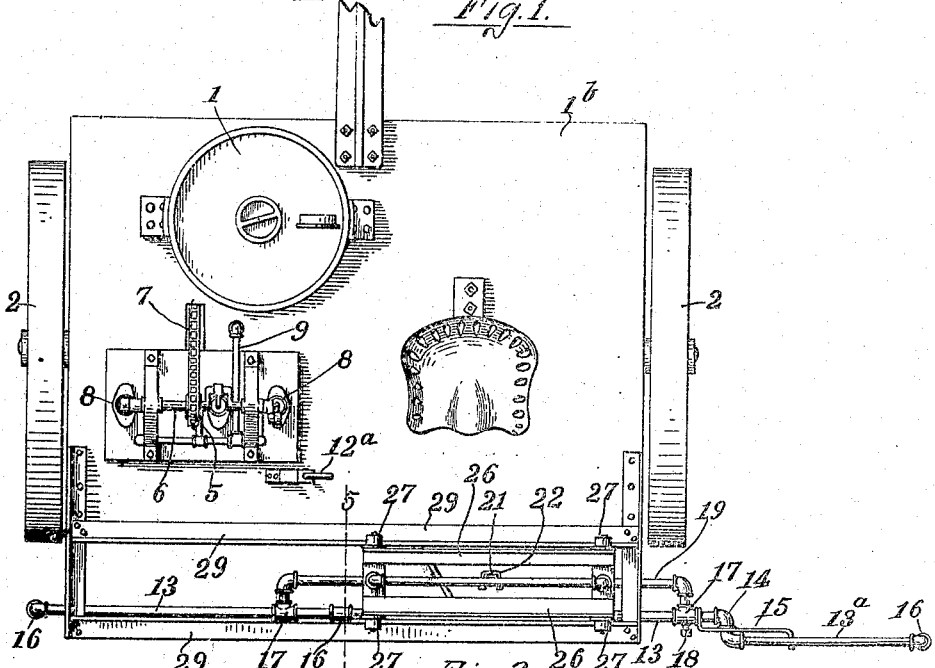
Figure 3:
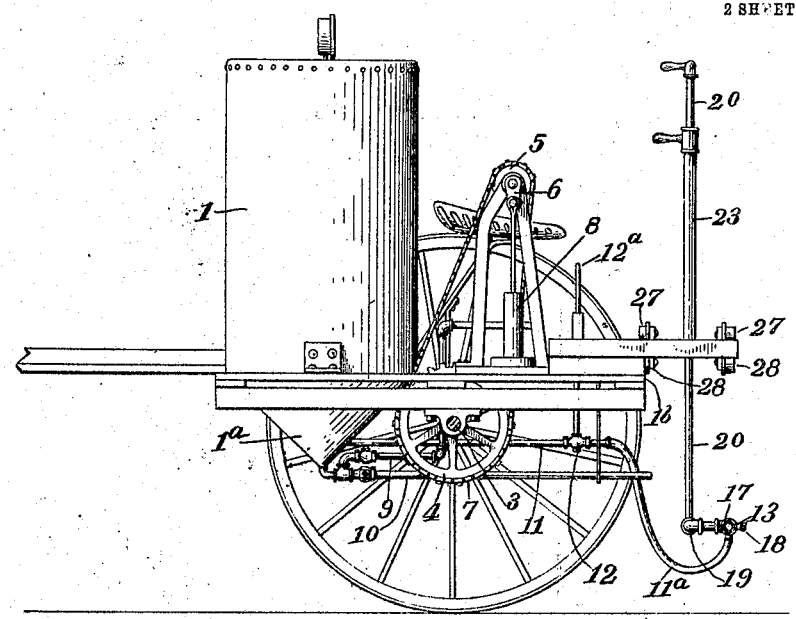
Figure 4:
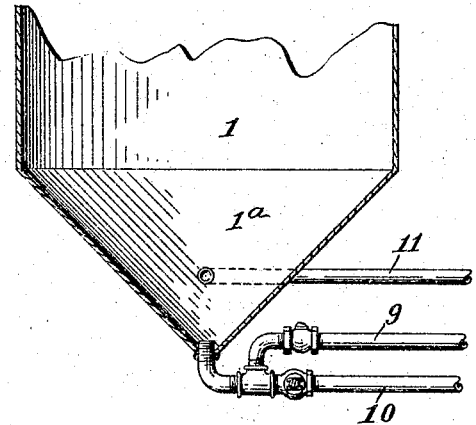
Figure 5:
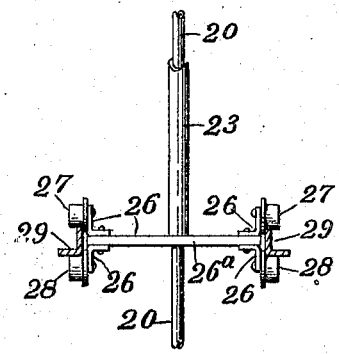

My invention consists mainly in a device provided with a tank to contain the fluid and having a conical bottom, an air pump connected to the tank by a pipe which enters the apex of the cone, a carriage supporting the spraying nozzles and movable transversely of the device, vertically adjustable supports for the nozzles mounted on the carriage, and in various features of construction and arrangement, as will more fully appear by reference to the accompanying drawings, in which:

Figure 1. is a rear elevation of a device embodying my invention; Fig. 2. a plan view of the same; Fig. 3. a side elevation of the same with one wheel removed; Fig. 4. an enlarged detail of the lower part of the tank and pipe attachments; and, Fig. 5. a transverse vertical sectional detail on the line 5 5 of Fig. 2.

Like numbers refer to like parts in all of the figures.

1 represents a tank of any convenient dimensions and provided with a cone bottom $1^a$ with its apex downward, and carried upon a platform $1^b$ mounted on carrying wheels 2, which wheels are on an axle 3 and rotate the same. On this axle is mounted a driving sprocket 4 connected by a chain 7 to a sprocket pinion 5 on a crank shaft 6, which shaft drives air pumps 8, which pumps communicate with the apex of the cone $1^a$ by pipes 9, whereby the air from said pumps is forced into the cone bottom at its apex at which point the sediment tends to settle.

10 is a blow-off pipe for removing the sediment or discharging the contents of the tank. When the pumps are operating the sediment is constantly driven upward and the contents of the tank agitated by the air, whereby any insoluble matter or sediment in the fluid is kept uniformly distributed throughout the fluid. In the side of the cone, or at any other convenient point, a pipe 11 is inserted which extends rearward, and is provided with a stop cock 12 operated by a lever $12^a$, and thence extending rearward is a flexible hose $11^a$, which communicates with a horizontally disposed distributing pipe 13 rotatively mounted in bearings 17 in a horizontally disposed support 19, and held in rotative adjustment by set screws 18, whereby the nozzles 16 may be adjusted at various angles rearward and downward. These nozzles are arranged at suitable intervals on the distributing pipe 13 and communicate therewith.

Extending upward from the support 19 is a yoke 20 vertically slidable in tubular supports 23 mounted on a carriage movable transversely of the platform $1^b$ on tracks 29 at the rear of the platform. This carriage preferably consists of angle irons 26 connected by transverse bars $26^a$ in which the tubular supports 23 are mounted, and on the upper angle irons 26 are journaled flanged wheels 27 adapted to traverse the upper side of the tracks and on the lower angle irons 26 are corresponding flanged wheels 28 traversing the under side of said tracks.

To vertically adjust the yoke 20, a rack bar 21 is attached to the lower end of the support 19 and extending upward therefrom is provided with teeth which engage a clip 22 in which the bar is vertically slidable and also laterally movable. To hold these teeth in proper engagement with the clips, a spring 25 is connected to the rack bar at one end and to the support 19 at the other end.

The device shown is adapted to operate four nozzles and apply fluid to four rows of vegetation. In order to reduce the length of the pipe 13 to within the width of the machine, said pipe is supplied at one or both ends with an extension $13^a$ connected by a double elbow 14, whereby the said extension turns on a horizontal axis and when extended outward is supported by an arm 15 consisting of a rod attached at its inner end to the pipe 13; supported on the elbows 14 and provided with a hook at the outer end in which the extension 13ª rests. Said extension can thus be folded inward alongside the pipe 13, when occasion requires, or extended outward as shown.

In operation the pumps 8 are operated by the forward movement of the device and supply air to the tank 1, which air entering at the apex of the cone, agitates the contents of the tank and prevents settling of sediment therein. The nozzles can be adjusted, the carriage be moved transversely of the machine, and the yoke raised and lowered, as occasion requires to properly direct the spray from the nozzles upon the vegetation. By changing the pipes 13 and 13ª, the device is readily adapted to rows of vegetation spaced apart differently.

What I claim is:

1. A sprayer, comprising a distributing pipe, nozzles at intervals on said pipe, a support for the pipe, a vertically adjustable yoke connected to the support, and a carriage supporting the yoke and movable to adjust the pipe.

2. A sprayer, comprising a horizontally disposed distributing pipe, nozzles at intervals on the same, means for supplying a fluid to said pipe, a support for the pipe in which the pipe is adjustable about its own axis, a carriage, a vertically adjustable yoke carrying the support and carried by the carriage, and tracks on which the carriage is movable.

3. A sprayer, comprising a tank having an inverted conical bottom, an air pump communicating with the apex of the conical bottom, means for operating the pump, a horizontally disposed distributing pipe having nozzles at intervals thereon, a hose communicating with the tank, a carriage movable to adjust the distributing pipe, a support in which the pipe is rotative, a yoke attached to the support, tubes supported by the carriage in which tubes the yoke is vertically adjustable, a ratchet bar connected to the support and adjustable vertically, and means for adjustably holding the ratchet bar.

4. A sprayer, comprising a horizontally disposed distributing pipe having nozzles at intervals, tracks parallel with the said pipe, a carriage mounted on said tracks and having wheels engaging both the upper and under sides of the tracks, tubes on the carriage, a yoke vertically slidable in the tubes and supporting the said pipe, a ratchet bar to adjust said yoke, a clip in which the bar is movable vertically and laterally, and a spring engaging the bar to hold the same in engagement with the clip.

In testimony whereof I affix my signature in presence of two witnesses.

D O BOWMAN.

Witnesses:
GEORGIANA CHACE,
LUTHER V. MOULTON.